US012811523B2

(12) United States Patent
Wada

(10) Patent No.: US 12,811,523 B2
(45) Date of Patent: Nov. 24, 2026

(54) MOTOR DRIVE CONTROL DEVICE, MOTOR UNIT, AND MOTOR DRIVE CONTROL METHOD

(71) Applicant: MINEBEA MITSUMI Inc., Kitasaku-gun (JP)

(72) Inventor: Naoyuki Wada, Kitasaku-gun (JP)

(73) Assignee: MINEBEA MITSUMI INC., Nagano (JP)

(*) Notice: Subject to any disclaimer, the term of this patent is extended or adjusted under 35 U.S.C. 154(b) by 194 days.

(21) Appl. No.: 18/843,822

(22) PCT Filed: Feb. 22, 2023

(86) PCT No.: PCT/JP2023/006473
§ 371 (c)(1),
(2) Date: Sep. 4, 2024

(87) PCT Pub. No.: WO2023/171392
PCT Pub. Date: Sep. 14, 2023

(65) Prior Publication Data

US 2025/0183825 A1 Jun. 5, 2025

(30) Foreign Application Priority Data

Mar. 9, 2022 (JP) ................................ 2022-036195

(51) Int. Cl.
*H02P 8/36* (2006.01)

(52) U.S. Cl.
CPC ..................................... *H02P 8/36* (2013.01)

(58) Field of Classification Search
CPC .. H02P 8/36; H02P 8/12; H02P 29/024; H02P 29/027

(Continued)

(56) References Cited

U.S. PATENT DOCUMENTS 6,265,891 B1 7/2001 Yamada et al.
7,786,688 B2 * 8/2010 Hayashi .................... H02P 7/28 318/400.29

(Continued)

FOREIGN PATENT DOCUMENTS

EP 3 279 617 A1 2/2018
JP H11-356085 A 12/1999

(Continued)

OTHER PUBLICATIONS

International Search Report for corresponding International Application No. PCT/JP2023/006473 mailed Apr. 11, 2023.

(Continued)

*Primary Examiner* — David Luo
(74) *Attorney, Agent, or Firm* — Chrisman Gallo Tochtrop LLC

(57) ABSTRACT

To more quickly detect a short circuit in a coil of a motor. In the motor drive control device, the control circuit includes a drive control signal generation unit configured to generate a drive control signal (Sd) so that a motor is in a drive state according to a drive command (Sc), a current limit value setting unit configured to set a current limit value (Ith), a current limit unit configured to instruct the drive control signal generation unit to stop excitation of a coil of the motor when a current flowing through the coil reaches the current limit value (Ith), a timer unit configured to measure an excitation time of the coil by a drive circuit, and a short-circuit determination unit configured to perform a short-circuit determination process of determining whether the coil is short-circuited, based on the time measured by the timer unit. When the time measured by the timer unit is less than a threshold value in the short-circuit determination process, the short-circuit determination unit determines the coil being short-circuited.

9 Claims, 11 Drawing Sheets

(58) Field of Classification Search
USPC .......... 318/696, 400.29, 400.26, 400.01, 700
See application file for complete search history.

(56) References Cited

U.S. PATENT DOCUMENTS

| | | | | |
|---|---|---|---|---|
| 8,796,972 | B2 * | 8/2014 | Wichert | G01R 31/34 318/101 |
| 9,584,049 | B2 * | 2/2017 | Aoki | H02P 6/14 |
| 10,514,285 | B2 * | 12/2019 | Shimura | G01F 1/60 |
| 2018/0038721 | A1 | 2/2018 | Shimura et al. | |
| 2020/0083827 | A1 | 3/2020 | Yamazaki et al. | |

FOREIGN PATENT DOCUMENTS

| | | | |
|---|---|---|---|
| JP | 2018-021823 | A | 2/2018 |
| JP | 2018-207607 | A | 12/2018 |

OTHER PUBLICATIONS

Written Opinion for corresponding International Application No. PCT/JP2023/006473 dated Apr. 11, 2023 and English translation.

* cited by examiner

MOTOR DRIVE CONTROL DEVICE, MOTOR UNIT, AND MOTOR DRIVE CONTROL METHOD

CROSS-REFERENCE TO RELATED APPLICATIONS

This application is a national stage entry of International Application No. PCT/JP2023/006473 filed on Feb. 22, 2023, which claims the benefit of priority to Japanese Application No. JP2022-036195, filed Mar. 9, 2022, the entire disclosures of which are hereby incorporated herein by reference.

TECHNICAL FIELD

The present invention relates to a motor drive control device, a motor unit, and a motor drive control method, and for example, relates to a motor drive control device for driving a stepping motor.

BACKGROUND ART

In a motor, when a coil is short-circuited for some reasons, a large current flows through a drive circuit such as an inverter circuit for driving the motor and the motor, and thus the drive circuit and the motor may fail. In order to avoid the failure caused by the short circuit in the coil, the short-circuit state of the coil needs to be more quickly detected and the driving of the motor needs to be stopped.

As related art of controlling a current in a motor, for example, Patent Document 1 discloses a motor drive control device having a current limiting function of limiting a current flowing through a coil of a stepping motor so as not to exceed a preset value.

CITATION LIST

Patent Literature

Patent Document 1: JP 2018-207607 A

SUMMARY OF INVENTION

Technical Problem

Most program processing devices such as microcontrollers performing general motor drive control have the current limiting function disclosed in Patent Document 1. However, the current limiting function disclosed in Patent Document 1 is, for example, a function of limiting a current in a coil when a drive mode of a motor is switched from an excitation mode (charge mode) to an attenuation mode. Accordingly, unless a state of the current in the coil exceeding a preset limit value continues for a certain period of time or more, the current is not limited, and thus a large current flowing instantaneously is not able to be prevented. In this way, the current limiting function of the microcontroller is not specialized in detecting a short circuit in the coil, and even though this function is simply used, a short circuit in the coil is not detectable unless a large current flows for a certain period of time or more.

A motor drive control device having an overcurrent detection function operating when a large current flows is also known. In the overcurrent detection function, the setting of a detection time and a detection current value can be changed by the microcontroller, but the degree of freedom is low. Accordingly, even a motor drive control device having an overcurrent detection function cannot detect a short circuit in a coil unless a large current flows for a certain period of time or more.

The present invention has been made to solve the problem described above, and an object of the present invention is to enable more quickly detect a short circuit in a coil of a motor.

Solution to Problem

A motor drive control device according to a typical embodiment of the present invention includes a control circuit configured to generate a drive control signal for controlling driving of a motor, and a drive circuit configured to excite a coil of the motor based on the drive control signal. The control circuit includes a drive control signal generation unit configured to generate the drive control signal so that the motor is in a drive state according to a drive command, a current limit value setting unit configured to set a current limit value serving as a reference for limiting a current flowing through the coil, a current limit unit configured to instruct the drive control signal generation unit to stop excitation of the coil when the current flowing through the coil reaches the current limit value, a timer unit configured to measure an excitation time of the coil by the drive circuit, and a short-circuit determination unit configured to perform a short-circuit determination process of determining, based on the time measured by the timer unit, whether the coil of the motor is short-circuited. When the time measured by the timer unit is less than a threshold value in the short-circuit determination process, the short-circuit determination unit determines the coil being short-circuited.

Advantageous Effects of Invention

A motor drive control device according to the present invention can more quickly detect a short circuit in a coil of a motor.

DESCRIPTION OF EMBODIMENTS

1. Overview of Embodiments

Figure 1:
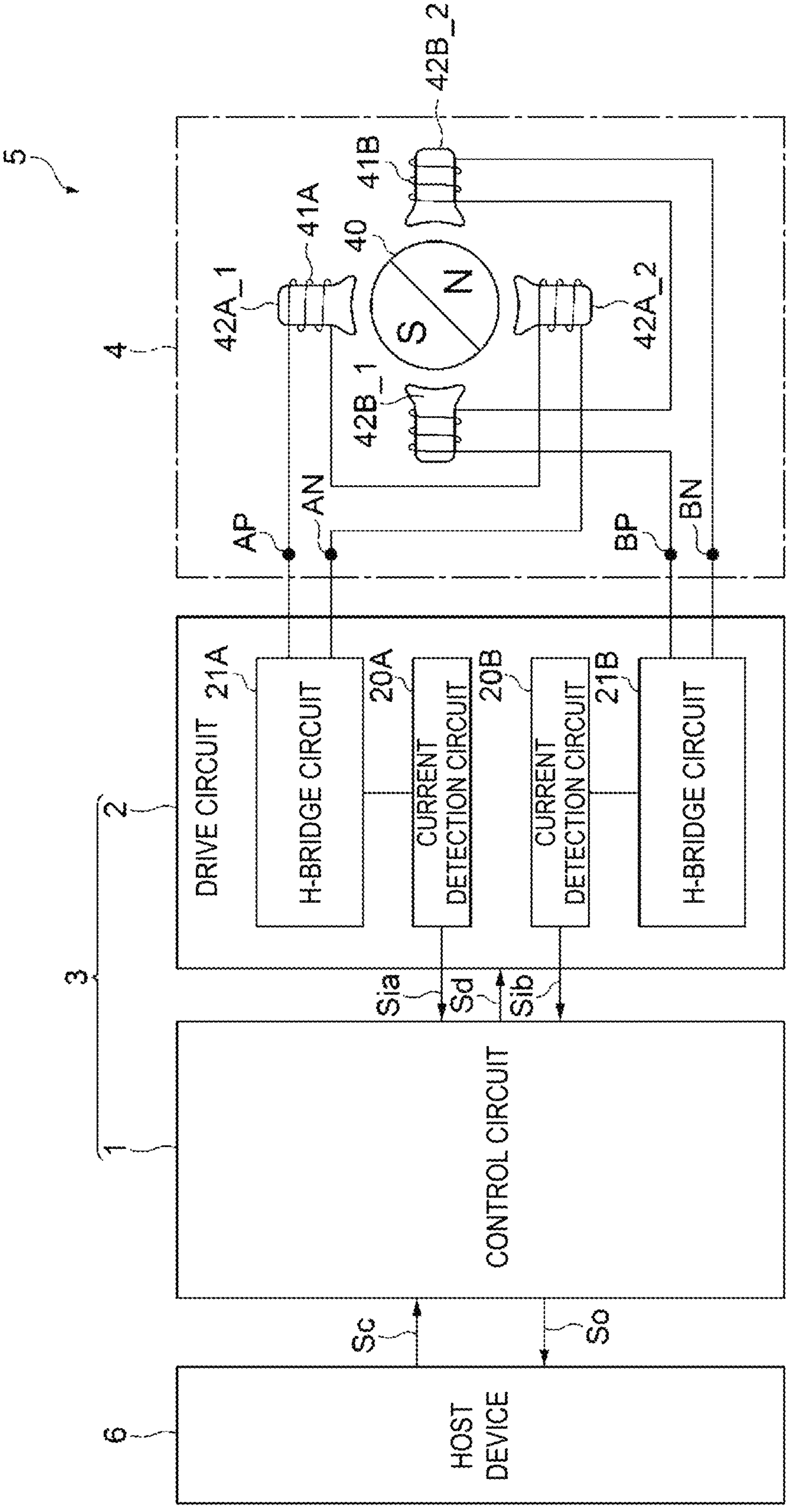
FIG. 1 is a block diagram illustrating a configuration of a motor unit according to an embodiment.

First, an overview of typical embodiments of the invention disclosed in the present application will be described. Note that, in the following description, by way of example, reference numerals on the drawings corresponding to the components of the invention are indicated in parentheses.

[1] A motor drive control device (3) according to a typical embodiment of the present invention includes a control circuit (1) configured to generate a drive control signal (Sd) for controlling driving of a motor (4), and a drive circuit (2) configured to excite a coil (41, 41A, 41B) of the motor based on the drive control signal. The control circuit includes a drive control signal generation unit (10) configured to generate the drive control signal so that the motor is in a drive state according to a drive command (Sc), a current limit value setting unit (15) configured to set a current limit value (Ith) serving as a reference for limiting a current flowing through the coil, a current limit unit (16) configured to instruct the drive control signal generation unit to stop excitation of the coil when the current flowing through the coil reaches the current limit value, a timer unit (19) configured to measure an excitation time of the coil by the drive circuit, and a short-circuit determination unit (17) configured to perform a short-circuit determination process of determining, based on the time measured by the timer unit, whether the coil of the motor is short-circuited. When the time measured by the timer unit is less than a threshold value in the short-circuit determination process, the short-circuit determination unit determines the coil being short-circuited.

[2] In the motor drive control device according to [1] above, the motor is a stepping motor including the coil (41A, 41B) of two phases, the timer unit measures the excitation time of the coil for each phase, and the short-circuit determination unit performs the short-circuit determination process for each phase based on the time for each phase measured by the timer unit.

[3] In the motor drive control device according to [1] or [2] above, the timer unit repeatedly measures the excitation time of the coil, and the short-circuit determination unit determines the coil in the motor being short-circuited when a time (cumulative time, average time, and the like) based on the time measured by the timer unit for a preset number of measurements is less than the threshold value.

[4] In the motor drive control device according to [3] above, the short-circuit determination unit includes a cumulative time calculation unit (170) configured to calculate a cumulative time (Ta) by accumulating the time measured by the timer unit for the preset number of measurements, and a determination unit (171) configured to determine the coil in the motor being short-circuited when the cumulative time is less than the threshold value.

[5] In the motor drive control device according to any one of [1] to [4] above, the control circuit has, as a control mode for controlling driving of the motor, a hold control mode for moving a rotor (40) of the motor to a predetermined standby position and maintaining the rotor before normal driving of the motor is started or before the normal driving is stopped, and the short-circuit determination unit performs the short-circuit determination process when the control mode is the hold control mode.

[6] In the motor drive control device according to [5] above, a period of the control mode being the hold control mode includes a first period (710) for causing the current limit value setting unit to change the current limit value to a predetermined value over time, and a second period (711) for causing the current limit value setting unit to fix the current limit value to the predetermined value. The current limit value setting unit keeps the current limit value constant during a part of the first period (712), and the short-circuit determination unit performs the short-circuit determination process during the part of the first period.

[7] In the motor drive control device according to any one of [1] to [6] above, the control circuit has, as the control mode for controlling driving of the motor, a normal control mode for moving the rotor of the motor to a rotational position specified by the drive command, and the short-circuit determination unit performs the short-circuit determination process in the normal control mode.

[8] In the motor drive control device according to any one of [1] to [7] above, the drive circuit includes an H-bridge circuit (21, 21A, 21B) including a plurality of switching elements (22 to 25), ON and OFF of the plurality of switching elements are controlled by the drive control signal, and the timer unit measures a time of the plurality of switching elements being turned on so that a current flows through the coil in one direction, and sets the measured time as an excitation time of the coil.

[9] A motor unit (5) according to a typical embodiment of the present invention includes the motor drive control device (3) according to any one of the above [1] to [8], and the motor (4).

[10] A method according to a typical embodiment of the present invention is a motor drive control method for exciting a coil (41, 41A, 41B) of a motor (4) to rotate a rotor (40) of the motor. The motor drive control method includes a first step of exciting the coil so that the motor is in a drive state according to a drive command (Sc), a second step of stopping the excitation of the coil when a current flowing through the coil exceeds a current limit value serving as a reference for limiting the current flowing through the coil; a third step of measuring an excitation time of the coil, and a fourth step of performing a short-circuit determination process (S2 to S7) of determining, based on the time measured in the third step, whether the coil of the motor is short-circuited. The short-circuit determination process in the fourth step includes a step (S7, S71, S72) of determining the coil being short-circuited when the time measured in the third step is less than a threshold value.

2. Specific Examples of Embodiments

Hereinafter, specific examples of embodiments of the present invention will be described with reference to the drawings. In the following description, the components common to the embodiments are denoted by the same reference signs, and the repeated descriptions are omitted.

First Embodiment

FIG. 1 is a block diagram illustrating a configuration of a motor unit 5 according to an embodiment.

As illustrated in FIG. 1, the motor unit 5 includes a motor 4 and a motor drive control device 3 for driving the motor 4. The motor unit 5 is applicable to various devices using, as a power source, a motor such as an actuator available for Heating Ventilation and Air-Conditioning (HVAC) serving as an air-conditioning unit for an on-board application.

The motor 4 is a stepping motor, for example. In the present embodiment, as an example, the motor 4 will be described as a two-phase stepping motor.

The motor 4 includes a rotor 40, an A-phase coil 41A, A-phase stator yokes 42A_1 and 42A_2, a B-phase coil 41B, and B-phase stator yokes 42B_1 and 42B_2.

The rotor 40 includes a permanent magnet subjected to multipolar magnetization along a circumferential direction such that an S pole and an N pole are alternately disposed. Note that in FIG. 1, a case of the rotor 40 with two poles is illustrated as an example.

The stator yokes 42A_1, 42A_2, 42B_1, and 42B_2 are provided at positions dividing the circumferential direction around the rotor 40 into four equal parts. For example, the A-phase stator yoke 42A_1 and the A-phase stator yoke 42A_2 are disposed to face each other across the rotor 40. The B-phase stator yoke 42B_1 and the B-phase stator yoke 42B_2 are disposed to face each other across the rotor 40 and to be perpendicular to the arrangement direction of the A-phase stator yoke 42A_1 and the A-phase stator yoke 42A_2.

Windings (coils) are wound around the stator yokes 42A_1, 42A_2, 42B_1, and 42B_2 in the same direction. For example, the windings wound around the stator yoke 42A_1 and the stator yoke 42A_2 are connected in series, and both the windings are collectively referred to as an A-phase "coil 41A". Similarly, the windings wound around the stator yoke 42B_1 and the stator yoke 42B_2 are connected in series, and both the windings are collectively referred to as a B-phase "coil 41B".

When a current flows through the A-phase coil 41A, the A-phase stator yokes 42A_1 and 42A_2 are excited, and when a current flows through the B-phase coil 41B, the B-phase stator yokes 42B_1 and 42B_2 are excited. The phase of the current flowing through each of the coils 41A and 41B is periodically switched, causing the rotor 40 to rotate. An output shaft (not illustrated) is connected to the rotor 40, and when the output shaft is driven by a rotational force of the rotor 40, for example, the function as the actuator described above is achieved. Note that, in the present embodiment, when not being individually distinguished, the coils 41A and 41B may be simply denoted as a "coil 41".

The motor drive control device 3 is a device for driving the motor 4. For example, the motor drive control device 3 controls an energization state of the coils 41A and 41B of each phase of the motor 4 based on a drive command Sc from a host device 6, thereby controlling rotation and stopping of the motor 4.

As illustrated in FIG. 1, the motor drive control device 3 includes a control circuit 1 and a drive circuit 2.

The drive circuit 2 is a circuit for driving the motor 4 by energizing the coils 41A and 41B of the motor 4. Based on a drive control signal Sd output from the control circuit 1, the drive circuit 2 rotates the rotor 40 of the motor 4 by exciting the coils 41A and 41B of the motor 4.

The drive circuit 2 includes an inverter circuit 21A for exciting the A-phase coil 41A, an inverter circuit 21B for exciting the B-phase coil 41B, a current detection circuit 20A for detecting a current in the A-phase coil 41A, and a current detection circuit 20B for detecting a current in the B-phase coil 41B.

The inverter circuits 21A and 21B are, for example, H-bridge circuits. Hereinafter, the inverter circuit 21A is also referred to as an "H-bridge circuit 21A", and the inverter circuit 21B is also referred to as an "H-bridge circuit 21B". When the H-bridge circuit 21A and the H-bridge circuit 21B are not distinguished from each other, the H-bridge circuits 21A and 21B are simply referred to as an "H-bridge circuit 21".

The H-bridge circuit 21A and the H-bridge circuit 21B have, for example, the same circuit configuration. Hereinafter, the configuration of the H-bridge circuit 21A of the A phase will be representatively described.

Figure 2A:
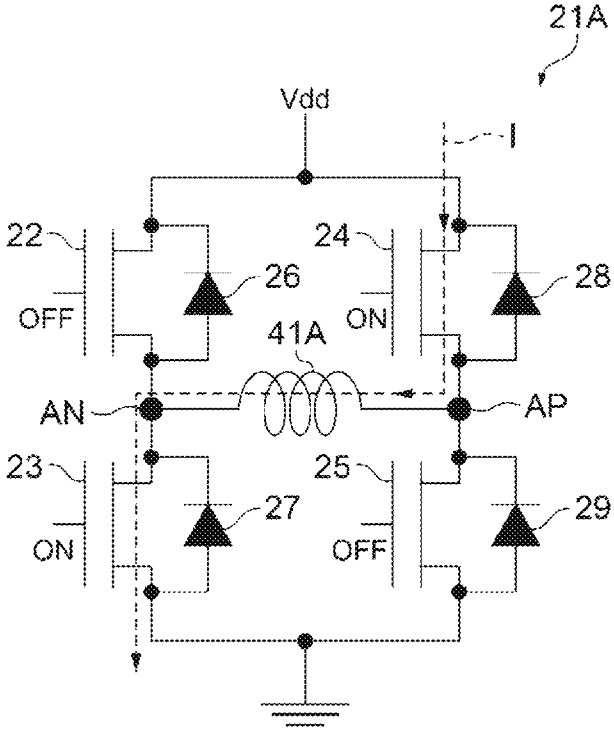
FIG. 2A is a diagram illustrating a connection relationship between an H-bridge circuit and a coil of a motor.
Figure 2B:
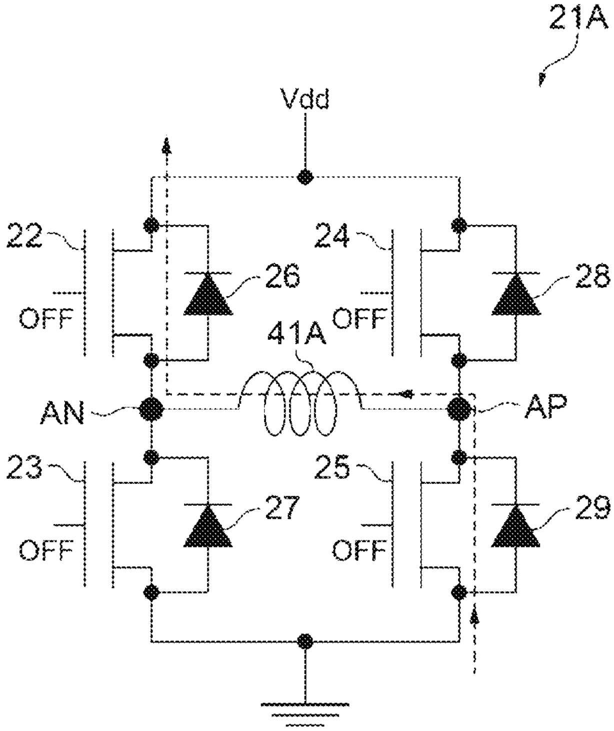
FIG. 2B is a diagram illustrating a connection relationship between an H-bridge circuit and a coil of a motor.

FIGS. 2A and 2B are diagrams illustrating a connection relationship between the H-bridge circuit 21A and the coil 41A of the motor 4.

As illustrated in FIGS. 2A and 2B, the H-bridge circuit 21A includes a plurality of switching elements 22 to 25 controlled to be turned on and off by the drive control signal Sd.

The switching element 22 and the switching element 23 are connected in series between a power supply voltage Vdd and a ground voltage. Similarly, the switching element 24 and the switching element 25 are connected in series between the power supply voltage Vdd and the ground voltage. A node connecting the switching element 22 and the switching element 23 to each other is connected to a terminal AN on a negative side of the coil 41A, and a node connecting the switching element 24 and the switching element 25 to each other is connected to a terminal AP on a positive side of the coil 41A.

The switching elements 22 to 25 are, for example, transistors. As illustrated in FIGS. 2A and 2B, diodes 26 to 29 may be connected in parallel with the switching elements 22 to 25, respectively. The diodes 26 to 29 may be parasitic diodes included in transistors serving as the switching elements 22 to 25, respectively, or may be diode elements serving as electronic components different from the switching elements 22 to 25.

The switching elements 22 to 25 are selectively turned on and off based on the drive control signal Sd to switch the energization state of the coil 41A. For example, as illustrated in FIG. 2A, when a current I flows from the terminal AP to the terminal AN of the A-phase coil 41A (A-phase+excitation) in a charge mode, the switching elements 23 and 24 are turned on and the switching elements 22 and 25 are turned off by the drive control signal Sd. Subsequently, as illustrated in FIG. 2B, by turning off all of the switching elements 22 to 25 in a penetration protection mode, a current flows from the ground potential to the power supply voltage Vdd through the diodes 29 and 26.

On the other hand, although not illustrated, when a current −I flows from the terminal AN to the terminal AP of the A-phase coil 41A in an excitation mode (A-phase-excitation), the switching elements 22 and 25 are turned on and the switching elements 23 and 24 are turned off by the drive control signal Sd.

In this way, by selectively turning on and off the switching elements 22 to 25 of the H-bridge circuit 21A based on the drive control signal Sd, the energization state (energization direction) of the A-phase coil 41A can be switched. Similarly for the phase B, by selectively turning on and off the switching elements 22 to 25 of the H-bridge circuit 21B, the energization state of the B-phase coil 41B can be switched.

The current detection circuit 20A is connected to the H-bridge circuit 21A, detects a current flowing through the coil 41A, and outputs a current detection signal Sia. The current detection circuit 20B is connected to the H-bridge circuit 21B, detects a current flowing through the coil 41B, and outputs a current detection signal Sib. The current detection circuits 20A and 20B each include, for example, a shunt resistor. The shunt resistors are connected in series with the H-bridge circuits 21A and 21B respectively between the power supply voltage Vdd and the ground voltage, for example, and voltages generated at both ends of the shunt resistors are output as the current detection signals Sia and Sib. Note that the current detection circuits 20A and 20B can adopt various known circuit configurations capable of detecting currents flowing through the coils 41A and 41B of the motor 4, and are not limited to the circuit configuration including the shunt resistor described above.

The drive circuit 2 may include a pre-drive circuit for driving the switching elements 22 to 25 of each of the H-bridge circuits 21A and 21B based on the drive control signal Sd.

The control circuit 1 is a circuit for performing centralized control of the motor drive control device 3.

The control circuit 1 is a program processing device (for example, a microcontroller), and in a configuration of the program processing device, a processor such as a CPU, various storage devices such as a RAM and a ROM, and peripheral circuits such as a timer (counter), an A/D conversion circuit, a D/A conversion circuit, and an input/output I/F circuit are connected to one another via a bus. In the present embodiment, the control circuit 1 is packaged as, for example, an integrated circuit (IC), but is not limited to such a configuration. Note that the control circuit 1 and the drive circuit 2 may be packaged into one.

The control circuit 1 has a function of controlling driving of the motor 4 by generating the drive control signal Sd and providing the drive control signal Sd to the drive circuit 2, and a function of detecting a short circuit in the coil 41 of the motor 4.

Figure 3:
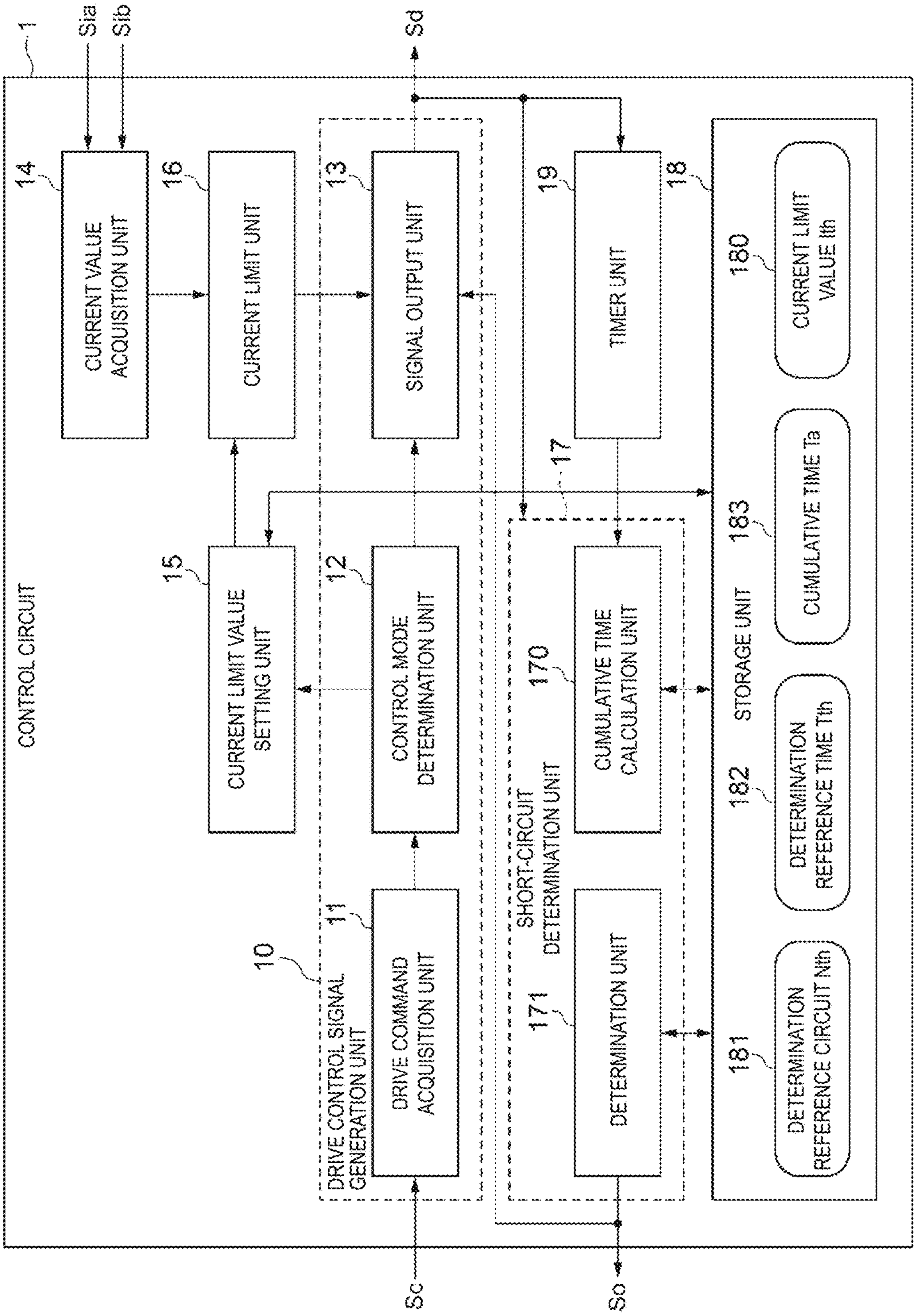
FIG. 3 is a diagram illustrating a configuration of a control circuit in a motor drive control device according to an embodiment.

FIG. 3 is a diagram illustrating a configuration of the control circuit 1 in the motor drive control device 3 according to the embodiment.

As illustrated in FIG. 3, the control circuit 1 includes a drive control signal generation unit 10, a current value acquisition unit 14, a current limit value setting unit 15, a current limit unit 16, a short-circuit determination unit 17, a storage unit 18, and a timer unit 19 as functional units for achieving the above-described functions.

In the program processing device (microcontroller) serving as the control circuit 1 described above, these functional units are realized, for example, by a processor executing an arithmetic process using various parameters stored in the storage device according to a program stored in the storage device, and controlling the peripheral circuits such as an A/D conversion circuit and a timer.

The drive control signal generation unit 10 is a functional unit for generating the drive control signal Sd so that the motor 4 is in a drive state according to the drive command Sc. For example, the drive control signal generation unit 10 includes a drive command acquisition unit 11, a control mode decision unit 12, and a signal output unit 13.

The drive command acquisition unit 11 acquires the drive command Sc for the motor 4 input from the outside (for example, the host device 6) of the motor drive control device 3. The drive command Sc includes, for example, information for specifying a rotational position of the motor 4, information for instructing rotation stop of the motor 4, and the like. The drive command Sc is, for example, a PWM signal.

The drive command acquisition unit 11 acquires information (target rotational position) on a target rotational position of the motor 4 by analyzing the drive command Sc, for example, and provides the acquired information to the control mode decision unit 12.

The control mode decision unit 12 determines a control mode for controlling driving of the motor 4. The signal output unit 13 generates and outputs the drive control signal Sd in accordance with the control mode determined by the control mode decision unit 12.

The drive control signal Sd is a signal for controlling ON and OFF of each of the switching elements 22 to 25 of the H-bridge circuits 21A and 21B.

The control circuit 1 has, for example, a normal control mode and a hold control mode as the control mode.

The normal control mode is a control mode for moving (rotating) the rotor 40 of the motor 4 to a rotational position (target rotational position) specified by the drive command Sc provided from the host device 6. In the following description, driving the motor 4 in the normal control mode is also referred to as "normal driving".

The hold control mode is a control mode for moving (rotating) the rotor 40 of the motor 4 to a predetermined standby position (target standby position) before starting the normal driving of the motor 4 or before stopping the normal driving of the motor 4, and then maintaining (holding) the rotor 40 at the standby position.

For example, in an initial state after the power supply voltage is supplied to the motor drive control device 3 and then the motor drive control device 3 is activated, the control mode decision unit 12 sets the control mode to the hold control mode. In the hold control mode before the start of the normal driving of the motor 4, the signal output unit 13 generates and outputs the drive control signal Sd to move the rotor 40 (output shaft) of the motor 4 to a preset target standby position (initial position). When the rotor 40 reaches the initial position, the signal output unit 13 generates and outputs the drive control signal Sd to stop (fix) the rotor 40 at the initial position in order to prevent the rotor 40 from moving from the initial position due to a load applied to the rotor 40, or the like.

Subsequently, when the control circuit 1 receives the drive command Sc from the host device 6, the control mode decision unit 12 switches the control mode from the hold control mode to the normal control mode. In the normal control mode, the signal output unit 13 generates and outputs the drive control signal Sd so that the rotor 40 moves to the target rotational position specified by the drive command Sc, and the motor 4 starts the normal driving. When the rotor 40 reaches the target rotational position, the control mode decision unit 12 switches the control mode from the normal control mode to the hold control mode before the normal driving of the motor 4 is stopped.

In the hold control mode before the normal driving of the motor 4 is stopped, the signal output unit 13 generates and outputs the drive control signal Sd to stop the rotor 40 at the target standby position in order to prevent the rotor 40 from moving from the target standby position due to a load applied to the rotor 40. As a result, the rotor 40 of the motor 4 moves to the target standby position and is fixed at the target standby position.

In order to move the rotor 40 to the target rotational position or the target standby position, the signal output unit 13 generates and outputs the drive control signal Sd to excite the A-phase coil 41A and the B-phase coil 41B at a predetermined timing based on a predetermined excitation method.

The predetermined excitation method is, for example, any one of a known one-phase excitation method, two-phase excitation method, 1-2-phase excitation method, and microstep method. Information specifying the excitation method is stored in the storage unit 18, for example, and the signal output unit 13 generates the drive control signal Sd in accordance with the information specifying the excitation method and stored in the storage unit 18.

When the drive control signal Sd is generated by the one-phase excitation method, the signal output unit 13, for example, generates and outputs the drive control signal Sd such that the energization states of the A-phase coil 41A and the B-phase coil 41B are switched in the order of "A-phase (+) excitation period" of flowing a current from the terminal AP to the terminal AN of the A-phase coil 41A, "B-phase (+) excitation period" of flowing a current from a terminal BP to a terminal BN of the B-phase coil 41B, "A-phase (−) excitation period" of flowing a current from the terminal AN to the terminal AP of the A-phase coil 41A, and "B-phase (−) excitation period" of flowing a current from the terminal BN to the terminal BP of the B-phase coil 41B.

For example, in the "A-phase (+) excitation period", the signal output unit 13 generates the drive control signal Sd so that the switching elements 22 and 25 of the H-bridge circuit 21 are turned on while the switching elements 23 and 24 of the H-bridge circuit 21 are turned off. In the "A-phase (−) excitation period", the signal output unit 13 generates the drive control signal Sd so that the switching elements 23 and 24 of the H-bridge circuit 21 are turned on while the switching elements 22 and 25 of the H-bridge circuit 21A are turned off. Similarly for the "B-phase (+) excitation period" and the "B-phase (−) excitation period", the signal output unit 13 generates the drive control signal Sd to selectively turn on/off the switching elements 22 to 25 of the B-phase H-bridge circuit 21B.

The storage unit 18 is a functional unit for storing various data necessary for motor drive control performed by the control circuit 1. For example, the storage unit 18 stores various data necessary for generating the drive control signal Sd and various data necessary for a short-circuit determination process of determining whether the coil 41 of the motor 4 is short-circuited. For example, as described below, the storage unit 18 stores information 180 on a current limit value Ith, information 181 on a determination reference number of times Nth, information 182 on a determination reference time Tth, information 183 on a cumulative time Ta, and the above-described information specifying the excitation method.

The current value acquisition unit 14 is a functional unit for acquiring a value of a current flowing through the coil 41 of each phase of the motor 4. The current detection signals Sia and Sib output from the current detection circuits 20A and 20B of the drive circuit 2 are input to the current value acquisition unit 14. The current value acquisition unit 14 includes, for example, an A/D conversion circuit, converts a voltage as the input current detection signal Sia into a digital value by the A/D conversion circuit, and outputs the digital value as a current value of the A-phase coil 41A. Similarly, the current value acquisition unit 14 converts a voltage as the current detection signal Sib into a digital value by using, for example, the A/D conversion circuit, and outputs the digital value as a current value of the B-phase coil 41B.

The current limit value setting unit 15 is a functional unit for setting the current limit value Ith.

The current limit value Ith is a reference value for limiting the current flowing through the coil 41 of the motor 4. In other words, the current limit value Ith is a value for defining an upper limit of the current flowing through the coil 41.

The information on the current limit value Ith is stored in advance in the storage unit 18 as the information 180 on the current limit value Ith, for example. Based on the information 180 on the current limit value Ith read from the storage unit 18, the current limit value setting unit 15 provides the current limit value Ith to the current limit unit 16. As described below, the current limit value setting unit 15 may output a constant (fixed) current limit value Ith or may change the current limit value Ith over time.

The current limit unit 16 is a functional unit for monitoring the current flowing through the coil 41 of the motor 4 and performing control such that the current does not exceed the current limit value Ith. The monitoring of the current by the current limit unit 16 is performed for each phase of the motor 4. For example, the current (current detection signal Sia) in the A-phase coil 41A is monitored during the "A-phase (+) excitation period" and the "A-phase (−) excitation period" of the A-phase coil 41A being excited, and the current (current detection signal Sib) of the B-phase coil 41B is monitored during the "B-phase (+) excitation period" and the "B-phase (−) excitation period" of the B-phase coil 41B being excited.

When the current flowing through the coil 41 reaches the current limit value Ith, the current limit unit 16 instructs the drive control signal generation unit 10 to stop the excitation of the coil 41. For example, the current limit unit 16 compares the current value of the coil 41 output from the current value acquisition unit 14 with the current limit value Ith, and when the current value of the coil 41 is equal to or greater than the current limit value Ith, the current limit unit 16 outputs a signal instructing to stop the excitation of the coil 41, that is, to stop turning on (to turn off) the switching elements 22 to 25 of the H-bridge circuit 21 by the drive control signal Sd.

The signal output unit 13 generates and outputs the drive control signal Sd to stop the excitation of the coil 41 while the signal instructing to stop the excitation of the coil 41 is output from the current limit unit 16. For example, when a signal instructing to stop the excitation of the A-phase coil 41A is output from the current limit unit 16 in the "A-phase (+) excitation period", the signal output unit 13 generates the drive control signal Sd to stop turning on (to turn off) the switching elements 22 and 25 in the A-phase H-bridge circuit 21A and to turn off all the switching elements 22 to 25 (see FIG. 2B). Thus, the current in the A-phase coil 41A is limited so as not to exceed the current limit value Ith. The current in the B-phase coil 41B is also limited by a similar method.

The timer unit 19 is a functional unit for measuring a time (excitation period) while the coil 41 of the motor 4 is being excited by the drive circuit 2. The timer unit 19 is implemented by using, for example, a counter or the like in the microcontroller constituting the control circuit 1.

The timer unit 19 measures a time (hereinafter, also referred to as an "excitation time") while the coils 41A and 41B are being excited, for each phase of the motor 4. For example, the timer unit 19 monitors the drive control signal Sd to measure a turn-on time of the plurality of switching elements 22 to 25 so that a current flows through the coil 41 in one direction, and sets the measured time as the excitation time of the coil 41.

For example, in the "+A-phase excitation period" of flowing a current from the terminal AP to the terminal AN of the A-phase coil 41A, the timer unit 19 monitors the drive control signal Sd, and starts the time measurement by the counter when detecting the start of control for turning on the switching elements 22 and 25 and turning off the switching elements 23 and 24 in the H-bridge circuit 21A. Subsequently, when detecting the switching elements 22 and 25 being turned off in the "+A-phase excitation period", the timer unit 19 stops the time measurement by the counter, stores the measured time in the storage unit 18, for example, and resets the counter.

In this way, the timer unit 19 repeatedly measures the excitation time of the coil 41 in accordance with ON and OFF of the switching element of the H-bridge circuit 21.

The short-circuit determination unit 17 is a functional unit for performing a short-circuit determination process of determining whether the coil 41 of the motor 4 is short-circuited, based on the excitation time measured by the timer unit 19 (hereinafter, also referred to as "measurement time").

The short-circuit determination unit 17 performs the short-circuit determination process for each phase based on the measurement time for each phase by the timer unit 19. For example, the short-circuit determination unit 17 identifies a phase to be excited by monitoring the drive control signal Sd, and performs the short-circuit determination process of the coil 41 of the excited phase by using the measurement time of the identified phase. When the measurement time measured by the timer unit 19 is less than a threshold value in the short-circuit determination process, the short-circuit determination unit 17 determines the coil 41 being monitored being short-circuited.

Figure 4:
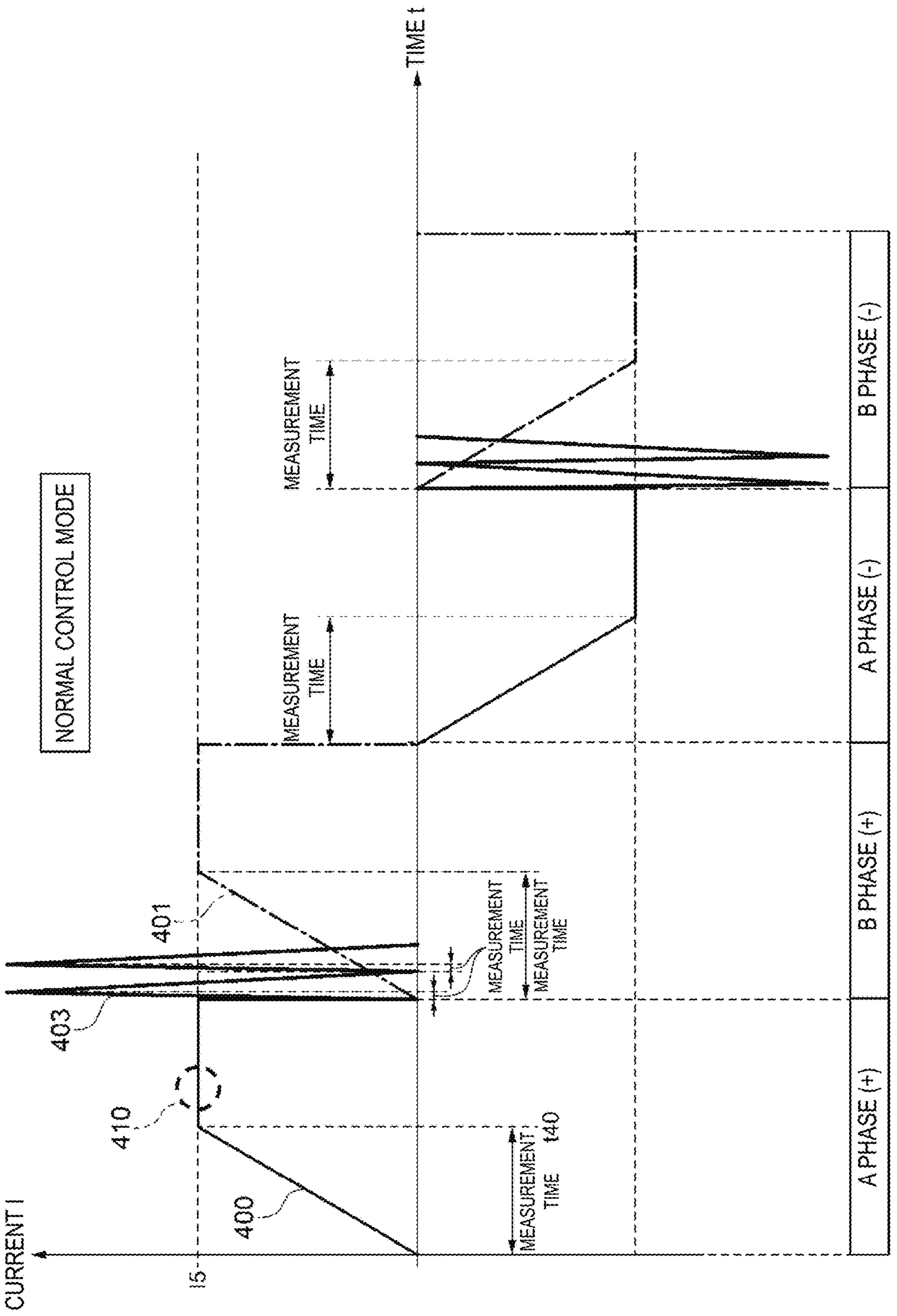
FIG. 4 is a diagram illustrating an example of waveforms of currents in coils of respective phases when a motor is driven by a one-phase excitation method in a normal control mode.

FIG. 4 is a diagram illustrating an example of waveforms of currents in the coils 41A and 41B of the respective phases when the motor 4 is driven by the one-phase excitation method in the normal control mode.

FIG. 4 illustrates temporal changes in the currents of the coils 41A and 41B when the excitation of the coil 41 is switched in the order of the A-phase (+) excitation period, the B-phase (+) excitation period, the A-phase (−) excitation period, and the B-phase (−) excitation period from time t (=0) in a case where the motor 4 is driven by the one-phase excitation method in the normal control mode.

Specifically, the solid line indicated by reference numeral 400 represents the characteristics of a current flowing through the A-phase coil 41A when the A-phase coil 41A is normal, and the one dot chain line indicated by reference numeral 401 represents the characteristics of a current flowing through the B-phase coil 41B when the B-phase coil 41B is normal. The solid line indicated by reference numeral 403 represents the characteristics of a B-phase current when the B-phase coil 41B is short-circuited. In FIG. 4, the current limit value Ith is set to "I5".

As indicated by the reference numerals 400 and 401, in a case where the coil 41 is not short-circuited and is in a normal state, when the excitation state of the coil 41 is switched, the current flowing through the coil 41 increases, and the current limit unit 16 performs control so that the current flowing through the coil 41 does not exceed the current limit value Ith (=15).

Figure 5:
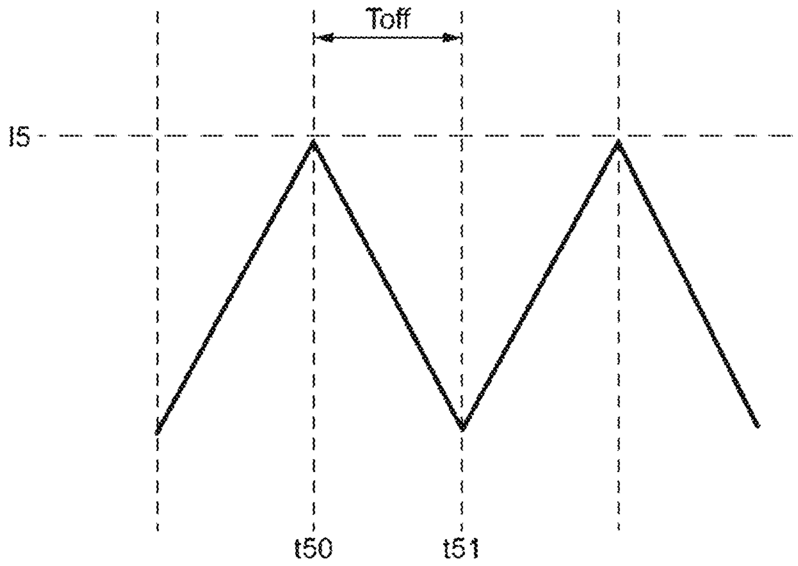
FIG. 5 is an enlarged diagram of a waveform of a current in a range of reference numeral 410 in FIG. 4.

FIG. 5 is an enlarged diagram of the waveform of the current in the range of reference numeral 410 in FIG. 4.

As illustrated in FIG. 5, in the A-phase (+) excitation period, at time t50 when the current flowing through the coil 41 reaches the current limit value Ith (=I5), the current limit unit 16 outputs a signal instructing to stop the excitation of the coil 41 (to turn off the switching elements 22 and 25). In response to the signal from the current limit unit 16, the signal output unit 13 stops outputting the drive control signal Sd to turn off the switching elements 22 and 25. Thus, the current in the coil 41 gradually decreases from "I5".

At time t51 after a certain period Toff has elapsed from the time t50, the signal output unit 13 outputs the drive control signal Sd to turn on the switching elements 22 and 25 again. In this way, when the coil 41 is in a normal state in the normal control mode, the current in the coil 41 is controlled not to exceed the current limit value Ith (=15).

On the other hand, for example, when the B-phase coil 41B is short-circuited in the normal control mode, as indicated by the reference numeral 403, immediately after the coil 41 being exited is switched from the A-phase to the B-phase, the current detected on the B-phase side steeply increases.

As illustrated in FIG. 4, when the coil 41 of the phase being monitored is short-circuited, the current exceeds the current limit value Ith during a period from, by the current limit unit 16, detecting the current in the phase being monitored reaching the current limit value Ith until stopping the excitation of the phase being monitored. Subsequently, when the switching elements 22 and 25 are turned off, the current in the coil 41 steeply decreases; however, when the switching elements 22 to 25 are turned on after the certain period Toff has elapsed, the current in the coil 41 exceeds the current limit value Ith again. Accordingly, when the coil 41 of the motor 4 is short-circuited, as illustrated in FIG. 4, a steep increase and a steep decrease in the current in the coil 41 are repeated in synchronization with the start and stop of the turn-on of the switching elements 22 and 25.

As illustrated in FIG. 4, in the motor 4, the temporal change rate of the current when the coil 41 is short-circuited is much larger than the temporal change rate of the current when the coil 41 is not short-circuited.

In this regard, in the motor drive control device 3 according to the present embodiment, the short-circuit determination unit 17 determines the coil 41 being short-circuited when the time from the start of the excitation of the coil 41 to the stop of the excitation, that is, the time measured by the timer unit 19 is less than a threshold value.

For example, the short-circuit determination unit 17 compares a time for one measurement with a threshold value, and determines the coil 41 of a phase being monitored being short-circuited when the time for one measurement is less than the threshold value. More preferably, when the time based on the time measured by the timer unit 19 for a preset number of measurements is less than the threshold value, the short-circuit determination unit 17 may determine the coil 41 being short-circuited.

Examples of the time based on the time measured by the timer unit 19 for the preset number of measurements can be exemplified as a cumulative time Ta obtained by accumulating the time measured by the timer unit 19 for the preset number of measurements, and an average value (average time) of the measurement time by the timer unit 19 for the preset number of measurements. As an example, a case of performing the short-circuit determination process based on the cumulative time Ta will be described in detail.

As illustrated in FIG. 3, the short-circuit determination unit 17 may include, for example, a cumulative time calculation unit 170 and a determination unit 171.

The cumulative time calculation unit 170 is a functional unit for accumulating the measurement time measured by the timer unit 19 for a plurality of times. The cumulative time calculation unit 170 calculates the cumulative time Ta by accumulating the measurement time measured by the timer unit 19 for a preset number of times.

For example, the determination reference number of times Nth indicating the number of measurements serving as a determination reference in the short-circuit determination process is stored in advance in the storage unit 18 as the information 181 on the determination reference number of times Nth. For example, the cumulative time calculation unit 170 accumulates the time measured for the number of times specified by the determination reference number of times Nth stored in the storage unit 18, and stores the accumulated time in the storage unit 18 as the cumulative time Ta.

The determination unit 171 is a functional unit for determining the presence or absence of a short circuit in the coil 41 based on the cumulative time Ta. When the cumulative time Ta stored in the storage unit 18 is less than the determination reference time Tth, the determination unit 171 determines the coil 41 being short-circuited.

The determination reference time Tth is a time (threshold value) serving as a reference for determining the presence or absence of a short circuit in the coil 41, and is stored in advance in the storage unit 18 as the information 182 on the determination reference time Tth, for example. For example, the determination reference time Tth is preferably set to a time sufficiently shorter than the time from the start of the excitation of the coil 41 until the current in the coil 41 reaches the current limit value Ith when the coil 41 is normal.

For example, when the determination reference number of times Nth is 2 (times), and the coil 41 as a short-circuit determination target is the B-phase coil 41B, the cumulative time calculation unit 170 counts up (+1) the value of the counter each time the measurement by the timer unit 19 is started in the B-phase excitation period, thereby measuring the number of measurements by the timer unit 19. Each time the number of measurements is counted up, the cumulative time calculation unit 170 accumulates the time measured by the timer unit 19 and stores the accumulated time in the storage unit 18 as the cumulative time Ta. Subsequently, when the number of measurements reaches two, the cumulative time calculation unit 170 adds the second measurement time to the cumulative value of the measurement time up to that point, and ends the accumulation of the measurement time.

When the number of measurements reaches the determination reference number of times Nth, the determination unit 171 compares the cumulative time Ta stored in the storage unit 18 with the determination reference time Tth. When the cumulative time Ta is equal to or greater than the determination reference time Tth, the determination unit 171 determines the B-phase coil 41B being not short-circuited, and continues the excitation control of the coil 41 in the normal control mode.

On the other hand, when the cumulative time Ta is less than the determination reference time Tth, the determination unit 171 outputs an abnormality detection signal So including information indicating the B-phase coil 41B being short-circuited. The abnormality detection signal So is input to the host device 6, for example.

The abnormality detection signal So may be input to the signal output unit 13. In this case, the signal output unit 13 may stop the excitation of the B-phase coil 41B (switching of the H-bridge circuit 21B) after the time point when the B-phase coil 41B is determined to be short-circuited in the excitation period of the B-phase coil 41B.

Although the case of performing the short-circuit determination process by the short-circuit determination unit 17 when the control mode is the normal control mode has been described in the above example, the short-circuit determination unit 17 may perform the short-circuit determination process also when the control mode is the hold control mode.

Figure 6:
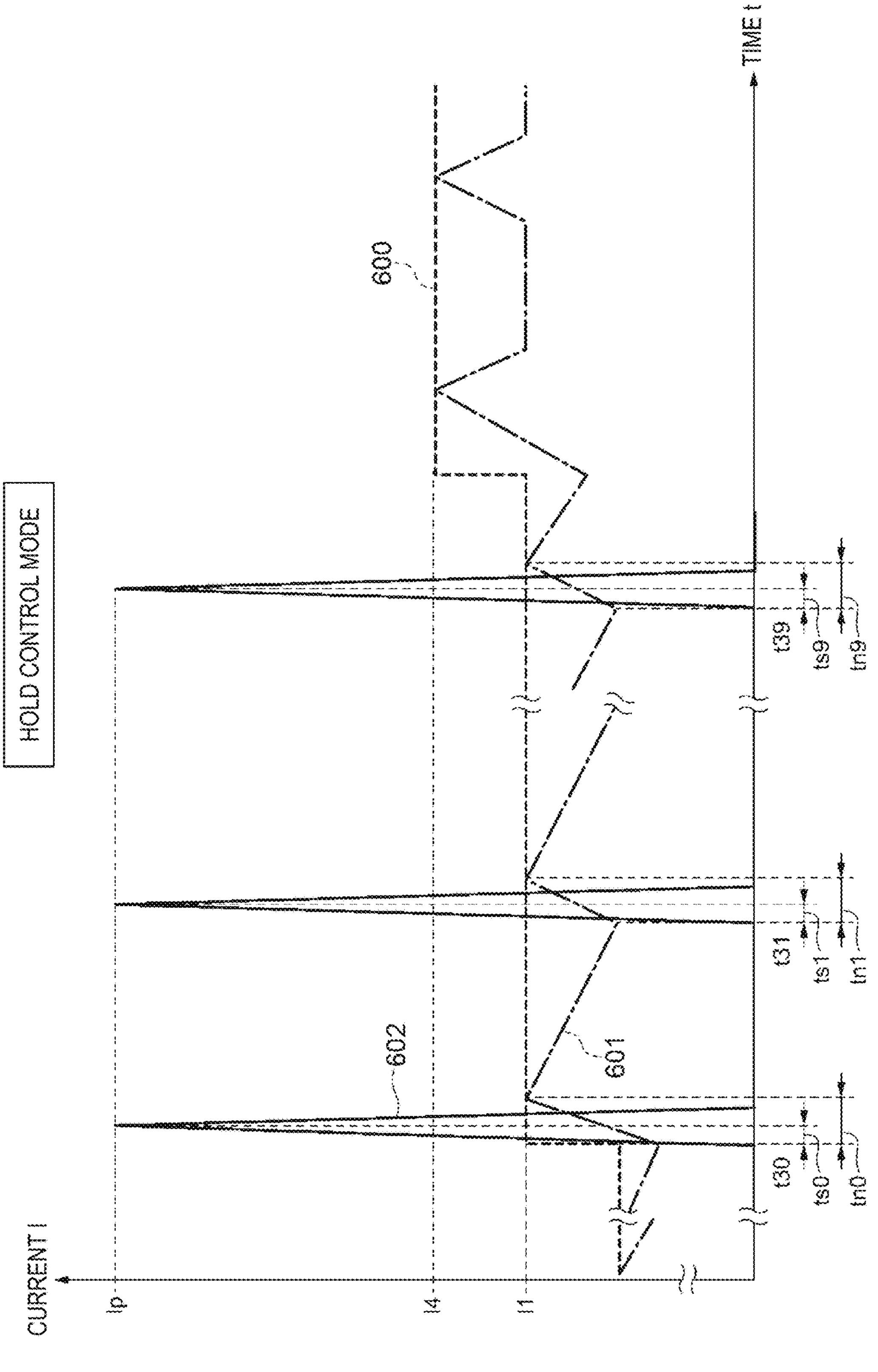
FIG. 6 is a diagram illustrating an example of a waveform of a current in an A-phase coil when a motor is driven in a hold control mode before the start of normal driving of the motor.

FIG. 6 is a diagram illustrating an example of a waveform of a current in the A-phase coil 41A when the motor 4 is driven in the hold control mode before the start of normal driving of the motor 4.

The dotted line indicated by reference numeral 600 represents the current limit value Ith. The one dot chain line indicated by reference numeral 601 represents the characteristics of the current flowing through the A-phase coil 41A when the A-phase coil 41A is normal. On the other hand, the solid line indicated by reference numeral 602 represents the characteristics of a current on the A-phase side when the A-phase coil 41A is short-circuited.

As indicated by the reference numeral 601, when the coil 41 is not short-circuited and is in a normal state, the A-phase coil 41A is excited in the hold control mode, and the current flowing through the A-phase coil 41A is controlled to linearly increase and not to exceed the current limit value Ith (=I1). When the current in the A-phase coil 41A reaches the current limit value Ith (=I1), the excitation of the A-phase coil 41A is stopped, and after a predetermined time has elapsed, the A-phase coil 41A is excited again. In the hold control period, one phase or two phases are excited to attract the rotor 40 to a holding position (a target rotational position or a target standby position), and the rotor 40 is continuously attracted to the position, so that the excitation phase is not switched.

On the other hand, when the A-phase coil 41A is short-circuited in the hold control mode, as indicated by the reference numeral 602, the A-phase current steeply increases immediately after the excitation of the A-phase coil 41A is started, and when the excitation of the A-phase coil 41A is stopped after the current reaches the current limit value Ith, the current steeply decreases.

In this way, when the coil 41 is short-circuited in the hold control mode, the current in the motor 4 repeatedly increases and decreases steeply like the case of the normal control mode.

For example, when the determination reference number of times Nth is 10 (times), and the coil 41 as a short-circuit determination target is the A-phase coil 41A, the cumulative time calculation unit 170 counts up (+1), for example, the value of the counter each time measurement by the timer unit 19 is started in the A-phase excitation period, thereby measuring the number of measurements by the timer unit 19. Each time the number of measurements is counted up, the cumulative time calculation unit 170 accumulates the time measured by the timer unit 19 and stores the accumulated time in the storage unit 18 as the information 183 on the cumulative time Ta. Subsequently, when the number of measurements reaches 10, the cumulative time calculation unit 170 adds the tenth measurement time to the cumulative value of the measurement time up to that point, and ends the accumulation of the measurement time.

For example, when the A-phase coil 41A is short-circuited, the cumulative time calculation unit 170 adds first to tenth measurement time ts0 to ts9 based on a current change indicated by the reference numeral 602 in FIG. 6, thereby obtaining a cumulative time Ta1 (=ts0+ts1+ . . . +ts9). For example, when the A-phase coil 41A is not short-circuited, the cumulative time calculation unit 170 adds first to tenth measurement time tn0 to tn9 based on a current change indicated by the reference numeral 601 in FIG. 6, thereby obtaining a cumulative time Ta2 (=tn0+tn1+ . . . +tn9).

When the number of measurements by the timer unit 19 reaches the determination reference number of times Nth (=10 times), the determination unit 171 compares the cumulative time Ta calculated by the cumulative time calculation unit 170 with the determination reference time Tth. For example, as indicated by the reference numeral 601 in FIG. 6, when the cumulative time Ta2 for ten times is greater than the determination reference time Tth (Ta2>Tth), the determination unit 171 determines the A-phase coil 41A being not short-circuited, and continues the excitation control of the A-phase coil 41A in the hold control mode.

On the other hand, as indicated by the reference numeral 602 in FIG. 6, when the cumulative time Ta1 for ten times is less than the determination reference time Tth (Ta1<Tth), the determination unit 171 determines the A-phase coil 41A being short-circuited, and outputs the abnormality detection signal So including information on the A-phase coil 41A being short-circuited. Subsequently, for example, the signal output unit 13 generates the drive control signal Sd to stop the excitation of the A-phase coil 41A after the output time point of the abnormality detection signal So (timing after the tenth measurement time ts9 is calculated). In the hold control mode, the control circuit 1 may change a current in the coil 41 to a target value over time.

Figure 7:
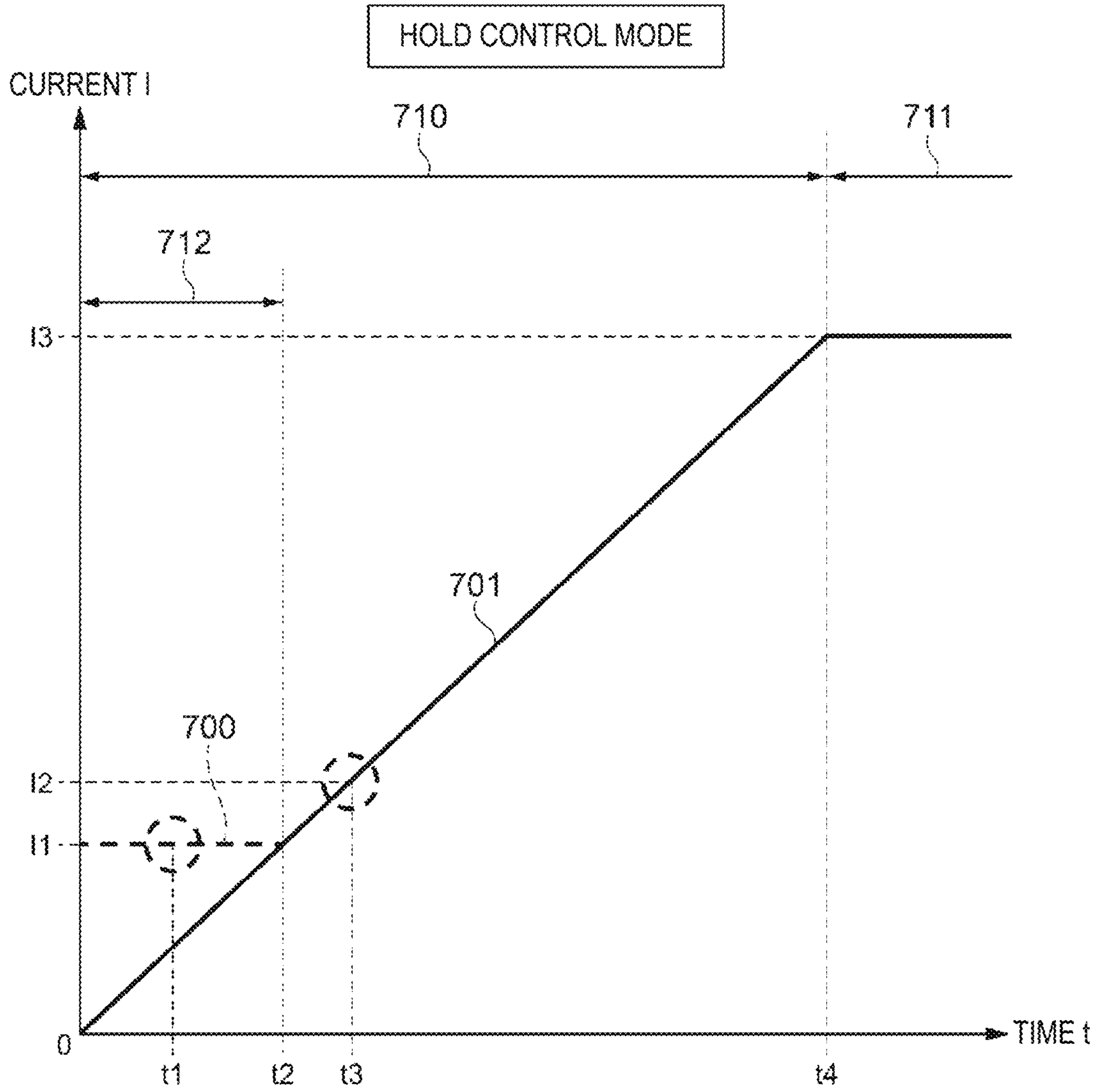
FIG. 7 is a diagram illustrating an example of characteristics of a current in a coil in a hold control mode before the start of normal driving of a motor.

FIG. 7 is a diagram illustrating an example of characteristics of a current in the coil 41 in the hold control mode before the start of the normal driving of the motor 4.

In FIG. 7, the solid line indicated by reference numeral 701 represents characteristics of a current in the coil 41 when the current limit value Ith is increased stepwise from 0 to a target value (=I3) in the hold control mode at the time of activation of the motor unit 5.

As illustrated in FIG. 7, the period of the control mode being the hold control mode includes, for example, a first period 710 for causing the current limit value setting unit 15 to change the current limit value Ith to a predetermined value (target value=I3) over time, and a second period 711 for causing the current limit value setting unit 15 to fix the current limit value Ith to the predetermined value (target value=I3). The first period 710 corresponds to a movement period (attraction period) of the rotor 40 of the motor 4 to the target standby position at the start of driving, and the second period 711 is a period of holding the rotor 40 at the standby position at the start of driving after the rotor 40 is moved until the start of driving. In this case, the short-circuit determination unit 17 may perform the short-circuit determination process at any timing in the first period 710. For example, the short-circuit determination unit 17 may perform the short-circuit determination process at time t3 when the current (current limit value Ith) of the coil 41 is I2.

On the other hand, while the current limit value Ith is changing, the magnitude of the current flowing through the coil 41 is not stable. In this regard, in the hold control mode, when control is performed to change the current in the coil 41 to a target current, the current limit value Ith may be constant during a part of the first period 710 with the current increasing, and the short-circuit determination process may be performed during the partial period.

For example, as illustrated in FIG. 7, the current limit value setting unit 15 sets the current limit value Ith to be constant (Ith=I1) in a partial period 712 from time t0 to time t2 in the first period 710, and the current limit value setting unit 15 changes the current limit value Ith to a predetermined value (for example, I3) in the first period 710 over time. Thus, in the period 712, the current in the coil 41 is limited to the current limit value (Ith=I1) and is substantially constant. At any timing (for example, time t1) in the period 712, the short-circuit determination unit 17 performs the short-circuit determination process. According to such a configuration, since the current in the coil 41 is substantially constant during the execution period of the short-circuit determination process, the presence or absence of a short-circuit in the coil 41 can be determined with higher accuracy.

The period 712 needs not necessarily to be an initial period of the first period 710, the current limit value Ith being constant in the period 712. For example, the current limit value Ith may be constant during a part of the period from time t3 to time t4 in FIG. 7.

A flow of the short-circuit determination process performed by the control circuit 1 will be described below.

Figure 8:
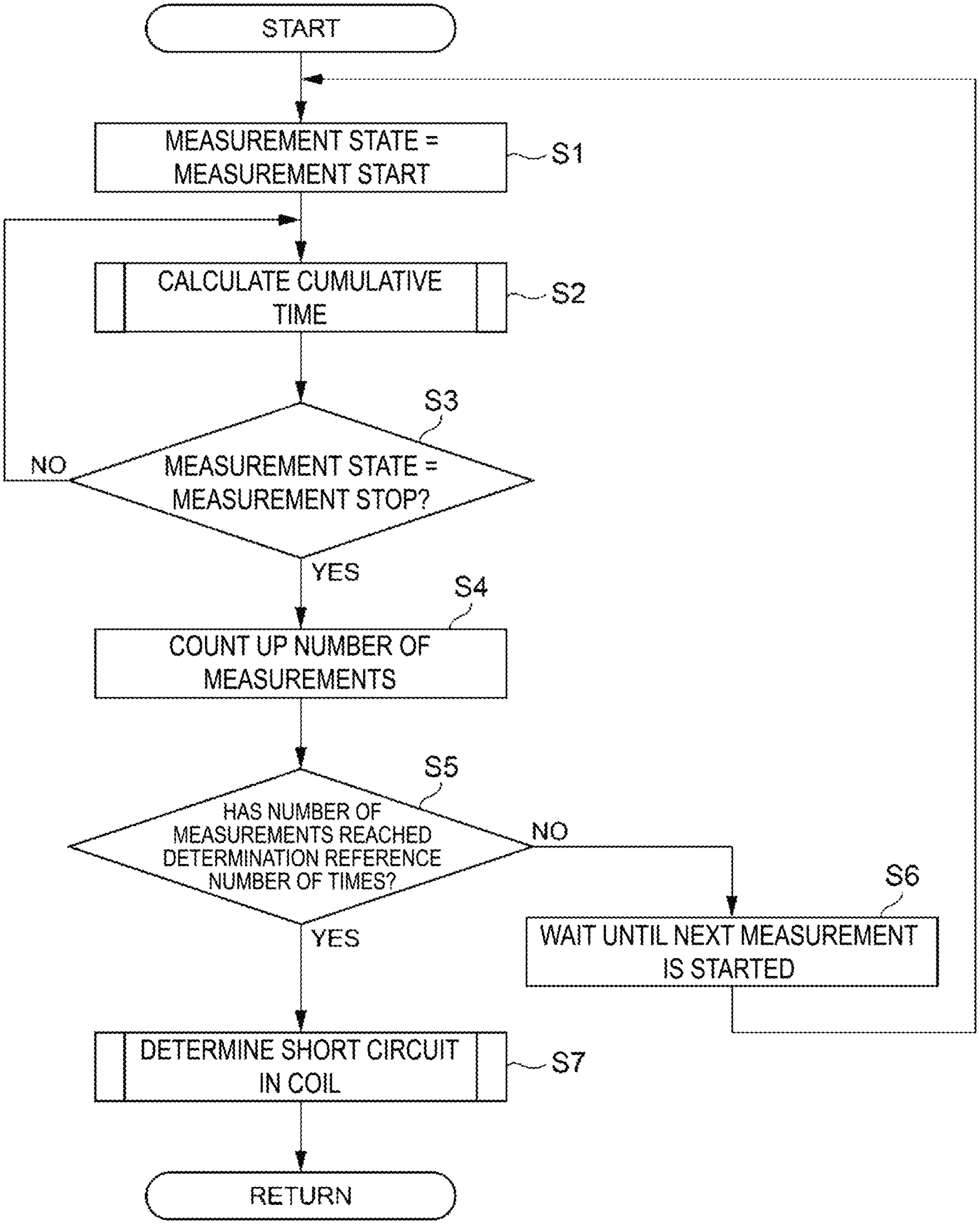
FIG. 8 is a flowchart illustrating a flow of a short-circuit determination process by a control circuit in a motor drive control device according to an embodiment.

FIG. 8 is a flowchart showing the flow of the short-circuit determination process performed by the control circuit 1 in the motor drive control device 3 according to the embodiment.

As an example, a processing flow when the short-circuit determination process is performed based on the above-described cumulative time Ta will be described.

For example, when the control mode is set to the normal control mode or the hold control mode and the motor drive control device 3 controls the driving of the motor 4 in the set control mode, the short-circuit determination unit 17 sets a flag indicating a measurement state based on the measurement state of the timer unit 19.

For example, the flag indicating the measurement state is set to "measurement stop (for example, 0)" as an initial value. When the excitation of a phase being monitored of the motor 4 is started, the timer unit 19 starts measuring an excitation time. At this time, the short-circuit determination unit 17 sets the flag indicating the measurement state to "measurement start (for example, 1)" in response to the start of the measurement by the timer unit 19 (step S1).

Subsequently, the short-circuit determination unit 17 performs a process of calculating the cumulative time Ta (step S2).

Figure 9:
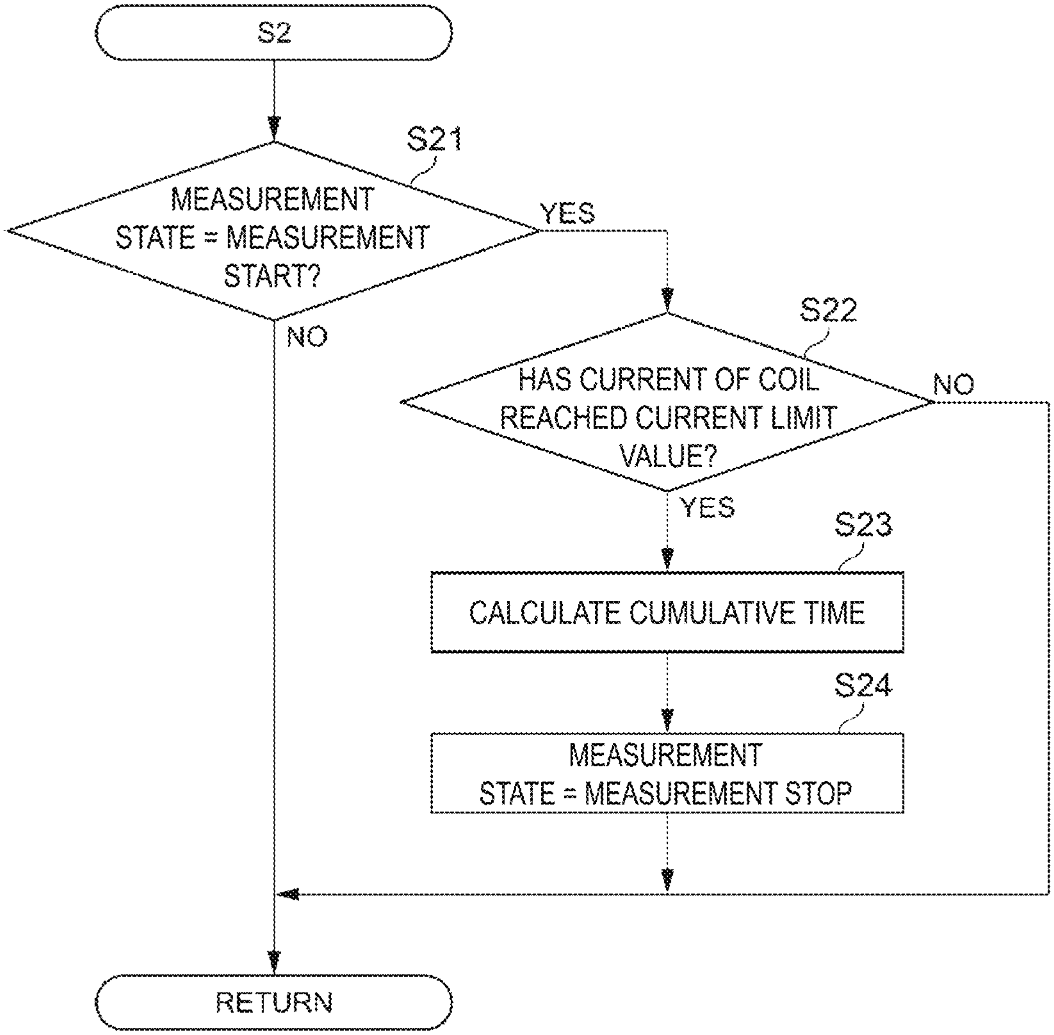
FIG. 9 is a flowchart illustrating a flow of a cumulative time calculation process (step S2).

FIG. 9 is a flowchart showing the flow of the process (step S2) of calculating the cumulative time Ta.

In the process of calculating the cumulative time Ta, the short-circuit determination unit 17 first determines whether the flag indicating the measurement state is "measurement start" (step S21). When the flag indicating the measurement state is not "measurement start", that is, when the flag indicating the measurement state is "measurement stop" (step S21: NO), the short-circuit determination unit 17 ends the process (step S2) of calculating of the cumulative time Ta.

On the other hand, when the flag indicating the measurement state is "measurement start" (step S21: YES), the short-circuit determination unit 17 determines whether a current in the coil 41 of the phase being monitored has reached the current limit value Ith (step S22). For example, the short-circuit determination unit 17 determines whether the current in the coil 41 of the phase being monitored has reached the current limit value Ith, by monitoring whether the timer unit 19 is measuring the excitation time.

When the timer unit 19 is measuring the excitation time, the short-circuit determination unit 17 determines the current in the coil 41 of the phase being monitored having not reached the current limit value Ith (step S22: NO), and ends the process (step S2) of calculating the cumulative time Ta.

When the timer unit 19 is not measuring the excitation time (stops measuring the excitation time), the short-circuit determination unit 17 determines the current in the coil 41 of the phase being monitored having reached the current limit value Ith (step S22: YES), accumulates the measurement time by the timer unit 19 for the number of measurements, and calculates the cumulative time Ta (step S23). Subsequently, the short-circuit determination unit 17 switches the flag indicating the measurement state from "measurement start" to "measurement stop" (step S24).

Subsequently, the short-circuit determination unit 17 ends the process (step S2) of calculating the cumulative time Ta.

Referring back to FIG. 8, after the process (step S2) of calculating the cumulative time Ta ends, the short-circuit determination unit 17 determines whether the flag indicating the measurement state is "measurement stop" (step S3). When the flag indicating the measurement state is not "measurement stop" (step S3: NO), the short-circuit determination unit 17 returns to step S2.

When the flag indicating the measurement state is "measurement stop" (step S3: YES), the short-circuit determination unit 17 counts up (+1) the number of measurements (step S4). Subsequently, the short-circuit determination unit 17 determines whether the number of measurements has reached the determination reference number of times Nth (step S5). When the number of measurements has not reached the determination reference number of times Nth (step S5: NO), the short-circuit determination unit 17 waits until the next measurement is started (step S6). Subsequently, the short-circuit determination unit 17 returns to step S1.

On the other hand, when the number of measurements has reached the determination reference number of times Nth (step S5: YES), the short-circuit determination unit 17 determines the presence or absence of a short circuit in the coil 41 of the phase being monitored (step S7).

Figure 10:
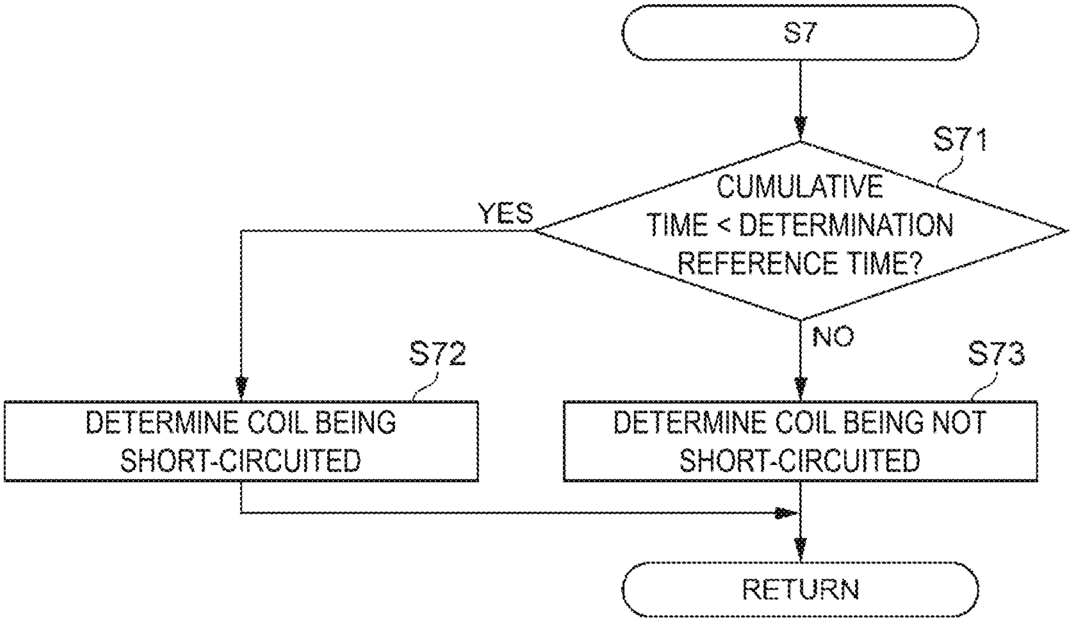
FIG. 10 is a flowchart illustrating a flow of a process (step S7) for determining the presence or absence of a short circuit in a coil.

FIG. 10 is a flowchart illustrating a flow of the process (step S7) for determining the presence or absence of the short circuit in the coil 41.

In step S7, the short-circuit determination unit 17 first determines whether the cumulative time Ta is less than the determination reference time Tth (step S71). When the cumulative time Ta is less than the determination reference time Tth (step S71: YES), the short-circuit determination unit 17 determines that the coil 41 of the phase being monitored is short-circuited (step S72). In this case, the short-circuit determination unit 17 outputs the abnormality detection signal So and ends the process of step S7.

On the other hand, when the cumulative time Ta is equal to or greater than the determination reference time Tth (step S71: NO), the short-circuit determination unit 17 determines that the coil 41 of the phase being monitored is not short-circuited (step S73), ends the process of step S7, and resets the cumulative time Ta. The short-circuit determination process is repeated at given intervals.

As described above, in the motor drive control device 3 according to the present embodiment, the control circuit 1 measures the excitation time of the coil 41, and stops the excitation and the measurement of the excitation time when the current in the coil 41 has reached the current limit value Ith.

As described above, when the coil 41 of the motor 4 is short-circuited, compared to the case of the coil 41 being not short-circuited, the time from the start of the excitation of the coil 41 until the current in the coil 41 reaches the current limit value Ith and the excitation is stopped is short. In this regard, when a measurement time is less than a threshold value, the control circuit 1 determines that the coil 41 is short-circuited. Thus, a short circuit in the coil 41 of the motor 4 can be detected more quickly.

Many microcontrollers and the like for conventional motor drive control having no coil short-circuit detection function have a function of measuring an excitation period of a coil of a motor, that is, a turned-on time of each switching element of an H-bridge circuit serving as a motor drive circuit.

Therefore, by applying a microcontroller for conventional motor drive control as the control circuit 1 according to the present embodiment and incorporating a program (software) related to the above-described short-circuit determination process into the above microcontroller, the short-circuit detection function of the motor 4 can be implemented at low cost with the existing microcontroller without developing new hardware as the control circuit 1.

In the motor drive control device 3, the control circuit 1 measures the excitation time of the coils 41A and 41B for each phase of the motor 4, and performs the short-circuit determination process for each phase based on the measurement time for each phase. According to such a configuration, even when the motor 4 includes coils 41 of a plurality of phases, a short circuit in the coil 41 can be reliably detected.

In the motor drive control device 3, the control circuit 1 may calculate an excitation time (cumulative time or average time) based on the measurement time for a preset number of measurements, and determine that the coil 41 is short-circuited in the motor when the excitation time is less than a threshold value.

According to such a configuration, for example, even when a current in the coil 41 steeply increases due to a load fluctuation or the like in the motor 4 in a normal state of the motor 4, erroneous detection of a short circuit in the coil 41 can be prevented and a short-circuit detection function with higher accuracy can be achieved.

In the motor drive control device 3, the control circuit 1 may have a hold control mode for moving the rotor 40 of the motor 4 to a predetermined standby position and maintaining the rotor 40 as a control mode for controlling the driving of the motor 4, and the control circuit 1 may perform the short-circuit determination process in a period of the control mode being the hold control mode.

According to such a configuration, for example, when the motor 4 is operated in the hold control mode before the normal driving of the motor 4 is started, a short-circuit in the coil 41 can be detected before the normal driving of the motor 4 is started, and the driving of the motor 4 can be stopped. Thus, the safety of the driving of the motor 4 can be improved.

As illustrated in FIG. 7, the period of the control mode being the hold control mode may include the first period 710 for causing the control circuit 1 to change the current limit value Ith to the predetermined value 13 over time and the second period 711 for causing the control circuit 1 to fix the current limit value Ith to the predetermined value 13, and the control circuit 1 may set the current limit value Ith to a constant value (11, for example) in the partial period 712 within the first period 710 and perform the short-circuit determination process in the period 712.

According to such a configuration, even in the hold control mode for causing a current to increase to a target value, a period for causing no change in the current is provided and the short-circuit determination process is performed in the period, thereby preventing a decrease in the accuracy of the short-circuit determination.

In the motor drive control device 3, the control circuit 1 may have, as a control mode for controlling the driving of the motor 4, a normal control mode for moving the rotor 40 of the motor 4 to a rotational position specified by the drive command Sc, and perform the short-circuit determination process in the normal control mode.

According to such a configuration, even when a short circuit in the coil 41 occurs during the normal driving of the motor 4, the short circuit in the coil 41 can be quickly detected.

In the motor drive control device 3, the drive circuit 2 includes the H-bridge circuits 21A and 21B each including the plurality of switching elements 22 to 25, On and OFF of the plurality of switching elements 22 to 25 are controlled by the drive control signal Sd, and the control circuit 1 measures the turn-on time of the plurality of switching elements 22 to 25 so that a current flows through the coil 41 in one direction, and sets the measured time as an excitation time of the coil 41.

According to such a configuration, whether the coil 41 is excited can be easily determined by monitoring the drive control signal Sd, thereby easily measuring the excitation time of the coil 41.

Expansion of Embodiments

The invention made by the present inventors has been specifically described above based on the embodiments, but the present invention is not limited to the embodiments, and it goes without saying that the present invention can be changed in various ways within the scope not departing from the gist of the present invention.

For example, the number of phases of the motor 4 in the above embodiment is not limited to two.

The motor 4 in the above embodiment is not limited to a stepping motor. For example, the motor may be a brushless DC motor.

In the first period 710 of the hold control mode illustrated in FIG. 7, the current (current limit value Ith) linearly increased; however, the present invention is not limited to such a case. For example, in the first period 710, the current (current limit value Ith) may increase in a stepwise manner or may increase in a curved manner.

The short-circuit determination process of the coil 41 in the hold control mode is not limited to being applied to the period of the hold control mode before the start of the normal driving of the motor 4 illustrated in FIG. 6 or FIG. 7, but is also applicable to the period of the hold control mode before the stop of the normal driving of the motor 4.

In the above embodiment, the case of the timer unit 19 accumulating the measurement time for a predetermined number of times has been exemplified; however, the number of measurements to be accumulated is not particularly limited. For example, as described above, the short circuit determination may be performed by comparing the time for one measurement with a threshold value without accumulating the measurement time.

In the above embodiment, when the coil is excited, the switching element is not turned off until the current in the coil reaches the current limit value after the switching element is turned on. On the other hand, in the case of PWM control for determining a PWM duty for each carrier frequency, the switching element repeats ON/OFF in accordance with the carrier frequency even before the current in the coil reaches the current limit value. Even in the case of such control, the present invention can be applied. In the above embodiment, the time from when the switching element is turned on until the current in the coil reaches the current limit value and the switching element is turned off is measured. However, in the case of the PWM control, the same effect as the effect of the above embodiment can be obtained by measuring the time from the start of the excitation of the coil until the current in the coil reaches the current limit value.

Although the case of each functional unit of the control circuit 1 being mainly implemented with program processing of a microcontroller or the like has been exemplified, the present invention is not limited to this case and a part or all of the functional unit of the control circuit 1 may be implemented with a dedicated circuit (hardware).

In addition, the flowcharts described above are examples for the purpose of explaining operations, and the embodiments are not limited to the flowcharts. That is, the steps illustrated in each drawing of the flowcharts are specific examples, and the embodiments are not limited to the flowcharts. For example, the order of some processing operations may be partially changed, another processing may be inserted between individual processing operations, or some processing operations may be performed in parallel.

REFERENCE SIGNS LIST

1 Control circuit, 2 Drive circuit, 3 Motor drive control device, 4 Motor, 5 Motor unit, 6 Host device, 10 Drive control signal generation unit, 11 Drive command acquisition unit, 12 Control mode decision unit, 13 Signal output unit, 14 Current value acquisition unit, 15 Current limit value setting unit, 16 Current limit unit, 17 Short-circuit determination unit, 18 Storage unit, 19 Timer unit, 20A, 20B Current detection circuit, 21, 21A, 21B H-bridge circuit (inverter circuit), 22 to 25 Switching element, 26 to 29 Diode, 40 Rotor, 41 41A, 41B Coil, 42A_1, 42A_2, 42B_1, 42B_2 Stator yoke, 170 Cumulative time calculation unit, 171 Determination unit, 180 Information on current limit value Ith, 181 Information on determination reference number of times Nth, 182 Information on determination reference time Tth, 183 Information on cumulative time Ta, AP, AN, BP, BN Terminal, Ith Current limit value, Nth Determination reference number of times, Sc Drive command, Sd Drive control signal, Sia, Sib Current detection signal, So Abnormality detection signal, Ta, Ta1, Ta2 Cumulative time, Tth Determination reference time

The invention claimed is:

1. A motor drive control device, comprising:

a control circuit configured to generate a drive control signal for controlling driving of a motor; and a drive circuit configured to excite a coil of the motor based on the drive control signal, wherein the control circuit comprises:

a drive control signal generation unit configured to generate the drive control signal so that the motor is in a drive state according to a drive command;

a current limit value setting unit configured to set a current limit value serving as a reference for limiting a current flowing through the coil;

a current limit unit configured to instruct the drive control signal generation unit to stop excitation of the coil when the current flowing through the coil reaches the current limit value;

a timer unit configured to measure an excitation time of the coil by the drive circuit; and a short-circuit determination unit configured to perform a short-circuit determination process of determining, based on the time measured by the timer unit, whether the coil of the motor is short-circuited, wherein, when the time measured by the timer unit is less than a threshold value in the short-circuit determination process, the short-circuit determination unit determines the coil being short-circuited, wherein the motor is a stepping motor including the coil of two phases, the timer unit measures the excitation time of the coil for each phase, and the short-circuit determination unit performs the short-circuit determination process for each phase based on the time for each phase measured by the timer unit.

2. The motor drive control device according to claim 1, wherein the timer unit repeatedly measures the excitation time of the coil, and the short-circuit determination unit determines the coil in the motor being short-circuited when a time based on the time measured by the timer unit for a preset number of measurements is less than the threshold value.

3. The motor drive control device according to claim 2, wherein the short-circuit determination unit comprises:

a cumulative time calculation unit configured to calculate a cumulative time by accumulating the time measured by the timer unit for the preset number of measurements; and a determination unit configured to determine the coil in the motor being short-circuited when the cumulative time is less than the threshold value.

4. The motor drive control device according to claim 1, wherein the control circuit has, as a control mode for controlling driving of the motor, a hold control mode for moving a rotor of the motor to a predetermined standby position and maintaining the rotor before normal driving of the motor is started or before the normal driving is stopped, and the short-circuit determination unit performs the short-circuit determination process when the control mode is the hold control mode.

5. The motor drive control device according to claim 4, wherein a period of the control mode being the hold control mode includes a first period for causing the current limit value setting unit to change the current limit value to a predetermined value over time, and a second period for causing the current limit value setting unit to fix the current limit value to the predetermined value, the current limit value setting unit keeps the current limit value constant during a part of the first period, and the short-circuit determination unit performs the short-circuit determination process during the part of the first period.

6. The motor drive control device according to claim 1, wherein the control circuit has, as the control mode for controlling driving of the motor, a normal control mode for moving the rotor of the motor to a rotational position specified by the drive command, and the short-circuit determination unit performs the short-circuit determination process in the normal control mode.

7. The motor drive control device according to claim 1, wherein the drive circuit includes an H-bridge circuit including a plurality of switching elements, ON and OFF of the plurality of switching elements are controlled by the drive control signal, and the timer unit measures a time of the plurality of switching elements being turned on so that a current flows through the coil in one direction, and sets the measured time as an excitation time of the coil.

8. A motor unit comprising:

the motor drive control device according to claim 1; and the motor.

9. A motor drive control method for exciting a coil of a motor to rotate a rotor of the motor, the motor drive control method comprising:

a first step of exciting the coil so that the motor is in a drive state according to a drive command;

a second step of stopping the excitation of the coil when a current flowing through the coil exceeds a current limit value serving as a reference for limiting the current flowing through the coil;

a third step of measuring an excitation time of the coil; and a fourth step of performing a short-circuit determination process of determining, based on the time measured in the third step, whether the coil of the motor is short-circuited, wherein the short-circuit determination process in the fourth step includes a step of determining the coil being short-circuited when the time measured in the third step is less than a threshold value, wherein the motor is a stepping motor including the coil of two phases, the third step includes measuring the excitation time of the coil for each phase, and the fourth step includes performing the short-circuit determination process for each phase based on the time for each phase measured by the timer unit.

* * * * *